US010025631B2

(12) United States Patent
Darji et al.

(10) Patent No.: US 10,025,631 B2
(45) Date of Patent: *Jul. 17, 2018

(54) COMPONENT SERVICES INTEGRATION WITH DYNAMIC CONSTRAINT PROVISIONING

(71) Applicant: International Business Machines Corporation, Armonk, NY (US)

(72) Inventors: Mehul H. Darji, Morrisville, NC (US); Clyde T. Foster, II, Raleigh, NC (US); Jhansi R. Kolla, Morrisville, NC (US); Joseph N. Kozhaya, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/838,617

(22) Filed: Aug. 28, 2015

(65) Prior Publication Data

US 2016/0147570 A1 May 26, 2016

Related U.S. Application Data (63) Continuation of application No. 14/553,272, filed on Nov. 25, 2014.

(51) Int. Cl.
*G06F 9/50* (2006.01)
*G06F 9/54* (2006.01)
*H04L 12/911* (2013.01)

(52) U.S. Cl.
CPC .............. *G06F 9/5011* (2013.01); *G06F 9/54* (2013.01); *G06F 9/546* (2013.01); *H04L 47/70* (2013.01); *H04L 47/822* (2013.01); *H04L 47/823* (2013.01)

(58) Field of Classification Search
CPC ............. H04L 67/1008; H04L 41/0896; H04L 47/783; H04L 47/70; G06F 9/5027;
(Continued)

(56) References Cited

U.S. PATENT DOCUMENTS 5,949,998 A * 9/1999 Fowlow .................... G06F 8/34
717/103
5,991,535 A * 11/1999 Fowlow .................... G06F 8/24
717/107

(Continued)

FOREIGN PATENT DOCUMENTS

| EP | 1387262 A1 | 2/2004 |
|---|---|---|
| GB | 2481191 A | 12/2011 |

OTHER PUBLICATIONS

Matthias Biehl, et al., High-Level Specification and Code Generation for Service-Oriented Tool Adapters, Proceedings of the 12th International Conference on Computational Science and Its Applications, 2012, pp. 35-42, IEEE, New York, NY.

(Continued)

*Primary Examiner* — Andrew Georgandellis
(74) *Attorney, Agent, or Firm* — Lee Law, PLLC; Christopher B. Lee (57) ABSTRACT

Resource provisioning information links to resource provisioning information of at least one reusable component resource that satisfies at least a portion of user-specified resource development constraints of a new resource under development are identified within a resource provisioning-link registry. Using the identified resource provisioning information links, the resource provisioning information of the at least one reusable component resource is programmatically collected from at least one data provider repository that stores reusable resources and that publishes the resource provisioning information links to the resource provisioning-link registry. The programmatically-collected resource pro- (Continued)

visioning information of the at least one reusable component resource is analyzed. Based upon the analyzed programmatically-collected resource provisioning information of the at least one reusable component resource, a resource integration recommendation is provided that uses the at least one reusable component resource and that satisfies at least the portion of the user-specified resource development constraints of the new resource under development.

6 Claims, 5 Drawing Sheets

(58) Field of Classification Search
CPC ............ G06F 17/30126; G06F 3/0683; G06F 17/30194; G06F 2009/4557; G06F 9/45558; G06F 9/5011
USPC .......... 707/E17.005, 737, E17.089; 709/217, 709/226; 708/1
See application file for complete search history.

(56) References Cited

U.S. PATENT DOCUMENTS

| | | | |
|---|---|---|---|
| 7,917,888 B2 | 3/2011 | Chong et al. | |
| 8,527,943 B1 | 9/2013 | Chiluvuri | |
| 9,356,883 B1 | 5/2016 | Borthakur | |
| 9,557,988 B2 | 1/2017 | Binjrajka | |
| 2002/0095656 A1 | 7/2002 | Clark et al. | |
| 2005/0080873 A1* | 4/2005 | Joseph | H04L 67/16 709/217 |
| 2006/0218127 A1* | 9/2006 | Tate | G06F 9/5055 |
| 2006/0253830 A1* | 11/2006 | Rajanala | G06F 8/36 717/105 |
| 2008/0178147 A1* | 7/2008 | Meliksetian | G06F 8/36 717/107 |
| 2008/0270313 A1* | 10/2008 | Cullen | G06Q 10/06 705/80 |
| 2009/0012963 A1* | 1/2009 | Johnson | G06F 9/5044 |
| 2009/0133021 A1* | 5/2009 | Coulter | G06F 9/5038 718/102 |
| 2010/0192127 A1 | 7/2010 | Son et al. | |
| 2011/0029538 A1* | 2/2011 | Harple, Jr. | G06F 17/30041 707/741 |
| 2012/0079450 A1 | 3/2012 | Reech et al. | |
| 2012/0198073 A1* | 8/2012 | Srikanth | G06F 9/5027 709/226 |
| 2013/0024834 A1 | 1/2013 | Cushing | |
| 2014/0006626 A1* | 1/2014 | Breiter | H04L 41/0806 709/226 |
| 2014/0095720 A1 | 4/2014 | Breiter et al. | |
| 2014/0095721 A1 | 4/2014 | Arwe et al. | |
| 2014/0164449 A1* | 6/2014 | Kim | G06F 9/5005 707/827 |
| 2016/0149825 A1 | 5/2016 | Darji et al. | |

OTHER PUBLICATIONS

Arthur G. Ryman, et al., OSLC Resource Shape: A language for defining constraints on Linked Data, Proceedings of the 2013 Linked Data on the Web Workshop, May 14, 2013, pp. 1-5, Ryman et al., Rio de Janeiro, Brazil.

Nandana Mihindukulasooriya, Open Services for Lifecycle Collaboration (OSLC)—Open Source Implementations, Web posting, Sep. 30, 2012, pp. 1-13, Published online at: http://www.nandana.org/2012/09/open-source-oslc-implementations.html.

Jim Conallen, et al., The REST API in Rational Software Architect Design Management 4.0, IBMdeveloperWorks, Jazz.net, Oct. 18, 2012, pp. 1-8, IBM Corporation, Published online at: https://jazz.net/library/article/1114.

Sandeep Somavarapu, Consuming Rational Team Concert's OSLC Change Management V2 Services, IBMdeveloperWorks, Jazz.net, Jul. 10, 2012, pp. 1-11, IBM Corporation, Published online at: https://jazz.net/library/article/1001.

Rich Williams, et al., Sample Workflows: The Kepler Project, Website/page, Printed from website on Nov. 18, 2014, pp. 1-5, Published online at: https://kepler-project.org/users/sample-workflows.

Author Unknown, Automation Scenarios, Open-Services for Lifecycle Collaboration, Webpage/site, Printed from website on Nov. 18, 2014, pp. 1-2, Creative Commons Attribution 3.0 US, Published online at: http://open-services.net/wiki/automation/Automation-Scenarios/.

Jinghai Rao, et al., A Survey of Automated Web Service Composition Methods, Proceedings of the First International Workshop on Semantic Web Services and Web Process Composition, 2004, pp. 43-54, Published online at: http://www.cs.cmu.edu/~jinghai/papers/survey_rao.pdf.

Hussien Ahmad, et al., Linked-OWL: A new approach for dynamic linked data service workflow composition, Webology, Jun. 2013, pp. 1-9, vol. 10, No. 1, Ahmad et al., Published online at: http://www.webology.org/2013/v10n1/a105.html.

IBM, List of IBM Patents or Patent Applications Treated as Related, Applicant Appendix, Aug. 28, 2015, pp. 1-2, the contents of which are incorporated herein by reference in their entirety.

United States Patent and Trademark Office, Office Action for U.S. Appl. No. 14/553,272, dated Oct. 6, 2016, pp. 1-32, Alexandria, VA, USA.

United States Patent and Trademark Office, Office Action for U.S. Appl. No. 14/553,272, dated May 10, 2017, pp. 1-17, Alexandria, VA, USA.

United States Patent and Trademark Office, Office Action for U.S. Appl. No. 14/553,272, dated Nov. 8, 2017, pp. 1-18, Alexandria, VA, USA.

* cited by examiner

302 — IDENTIFY, BY A PROCESSOR WITHIN A RESOURCE PROVISIONING-LINK REGISTRY, RESOURCE PROVISIONING INFORMATION LINKS TO RESOURCE PROVISIONING INFORMATION OF AT LEAST ONE REUSABLE COMPONENT RESOURCE THAT SATISFIES AT LEAST A PORTION OF USER-SPECIFIED RESOURCE DEVELOPMENT CONSTRAINTS OF A NEW RESOURCE UNDER DEVELOPMENT

304 — PROGRAMMATICALLY COLLECT, USING THE IDENTIFIED RESOURCE PROVISIONING INFORMATION LINKS, THE RESOURCE PROVISIONING INFORMATION OF THE AT LEAST ONE REUSABLE COMPONENT RESOURCE FROM AT LEAST ONE DATA PROVIDER REPOSITORY THAT STORES REUSABLE RESOURCES AND THAT PUBLISHES THE RESOURCE PROVISIONING INFORMATION LINKS TO THE RESOURCE PROVISIONING-LINK REGISTRY

306 — ANALYZE THE PROGRAMMATICALLY-COLLECTED RESOURCE PROVISIONING INFORMATION OF THE AT LEAST ONE REUSABLE COMPONENT RESOURCE

308 — PROVIDE, BASED UPON THE ANALYZED PROGRAMMATICALLY-COLLECTED RESOURCE PROVISIONING INFORMATION OF THE AT LEAST ONE REUSABLE COMPONENT RESOURCE, A RESOURCE INTEGRATION RECOMMENDATION THAT USES THE AT LEAST ONE REUSABLE COMPONENT RESOURCE AND THAT SATISFIES AT LEAST THE PORTION OF THE USER-SPECIFIED RESOURCE DEVELOPMENT CONSTRAINTS OF THE NEW RESOURCE UNDER DEVELOPMENT

COMPONENT SERVICES INTEGRATION WITH DYNAMIC CONSTRAINT PROVISIONING

BACKGROUND

The present invention relates to application and service solution development and deployment. More particularly, the present invention relates to component services integration with dynamic constraint provisioning.

Computing applications allow users to create and manipulate information. Developers of computing applications typically create an application for a specific purpose, such as word processing, electronic mail, or other purposes.

SUMMARY

A method includes identifying, by a processor within a resource provisioning-link registry, resource provisioning information links to resource provisioning information of at least one reusable component resource that satisfies at least a portion of user-specified resource development constraints of a new resource under development; programmatically collecting, using the identified resource provisioning information links, the resource provisioning information of the at least one reusable component resource from at least one data provider repository that stores reusable resources and that publishes the resource provisioning information links to the resource provisioning-link registry; analyzing the programmatically-collected resource provisioning information of the at least one reusable component resource; and providing, based upon the analyzed programmatically-collected resource provisioning information of the at least one reusable component resource, a resource integration recommendation that uses the at least one reusable component resource and that satisfies at least the portion of the user-specified resource development constraints of the new resource under development.

A system includes a communication device; and a processor programmed to: identify, using the communication device within a resource provisioning-link registry, resource provisioning information links to resource provisioning information of at least one reusable component resource that satisfies at least a portion of user-specified resource development constraints of a new resource under development; programmatically collect, using the identified resource provisioning information links, the resource provisioning information of the at least one reusable component resource from at least one data provider repository that stores reusable resources and that publishes the resource provisioning information links to the resource provisioning-link registry; analyze the programmatically-collected resource provisioning information of the at least one reusable component resource; and provide, based upon the analyzed programmatically-collected resource provisioning information of the at least one reusable component resource, a resource integration recommendation that uses the at least one reusable component resource and that satisfies at least the portion of the user-specified resource development constraints of the new resource under development.

A computer program product includes a computer readable storage medium having computer readable program code embodied therewith, where the computer readable program code when executed on a computer causes the computer to: identify, within a resource provisioning-link registry, resource provisioning information links to resource provisioning information of at least one reusable component resource that satisfies at least a portion of user-specified resource development constraints of a new resource under development; programmatically collect, using the identified resource provisioning information links, the resource provisioning information of the at least one reusable component resource from at least one data provider repository that stores reusable resources and that publishes the resource provisioning information links to the resource provisioning-link registry; analyze the programmatically-collected resource provisioning information of the at least one reusable component resource; and provide, based upon the analyzed programmatically-collected resource provisioning information of the at least one reusable component resource, a resource integration recommendation that uses the at least one reusable component resource and that satisfies at least the portion of the user-specified resource development constraints of the new resource under development.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides component services integration with dynamic constraint provisioning. The technology described herein provides a solution to an identified problem that has resulted from increases in the complexity of technological domains within which new applications and service solutions are deployed and operate. Several technical features that improve application and service solution development are provided by the present subject matter. For example, the present technology improves application and service solution (collectively "resources") development capabilities by facilitating integration of component resources, with optimization and integration of a variety of heterogeneous resource interfaces. A resource provisioning-link registry may dynamically collect and publish uniform resource identifiers (URIs) that specify resource storage locations, instrumentation source locations, and inter-relationship information among resources and repositories that publish the resource information/URIs. A developer may specify resource constraints for a new resource, and URIs that specify reusable resource information may be retrieved from the resource provisioning-link registry. The URIs may be automatically traversed to provide resource integration recommendations based upon a comparison of the specified resource constraints. The developer/user may iteratively adjust the specified resource constraints and may be iteratively provided with resource integration recommendations during the development of the new resource. The newly-developed resource may be published to a storage repository and its location and reuse information may also be published to the resource provisioning-link registry as a candidate for reuse. As such, the present technology may improve both new resource development and new resource reuse.

As described herein, the published dynamic resource-related information and links to the information may be dynamically increased over time as instrumented capabilities for resources increase. Predictive analytics may also be performed using the published dynamic service-related and component-related information to evaluate an expected performance of a new resource. As introduced above, in response to a determination of a satisfactory expected performance, the new resource may be deployed and URIs may be added to the resource provisioning-link registry to allow information retrieval and reuse of the new resource as part of one or more additional integrated applications or service solutions. Accordingly, as the complexity of technological demands for applications and service solutions increases over time, the present technology may dynamically improve each of development, deployment, and reuse of applications and service solutions.

The present technology provides for resource development, with life cycle management, using application preferences and a service-provider resource information aggregation. The service-provider resource-based modeling of resources described herein offers an open system for the enhancement of resource information over time that allows managed component resources and their usage to be reused under a constraint set that is specified for the newly-developed resource.

To avoid repeated description of an "application and service solution," and to improve readability of the present description, the terms "application" and "service solution" and "resource" may be used interchangeably herein as appropriate for a particular aspect of the description. However, to avoid redundancy of description, it should be noted that any description herein that references an "application," or a "service solution," or a "resource," is also considered to include a contemporaneous description of the subject matter applied to the respective other terms unless the particular portion of the description expressly distinguishes the terms herein. Similarly, the phrase "dynamic service-related and component-related information" may be alternatively referred to as "dynamic registry information" or "registry information" to also improve readability of the present description, with the understanding that the dynamic registry information provides aggregated access to existing heterogeneous resources for which information is published by multiple different resource repositories. Further, the term "consuming resource" refers to a resource that collects or utilizes other resources and/or information published in the resource provisioning-link registry. The term "instrumentation" refers to published resource application programming interface (API) information, monitored or published historical resource utilization information, and other resource public interface information. Regarding resource API information, there may be different classifications of APIs for different classes of use of a resource, and there may be different levels of functionality provided by the different APIs. Regarding monitored or published historical resource utilization information, such information may include, among other things, details of consumed memory, central processing unit (CPU), disk space, overall service utilization patterns (e.g., open ports, interfaces, etc.), and other values that may be useful in making resource reutilization decisions. Other possibilities for instrumentation of resources are possible based upon the description herein, and all such possibilities are considered to be within the scope of the present subject matter.

One or more data provider/resource repositories store resources, store inter-relationships and dependencies that relate to a particular resource, and store relationship information that identifies relationships between resources. Using the published resource information locations in the data provider/resource repositories, the consuming resource(s) may collect a spectrum of detailed information related to a particular service or service topology. The detailed information may be categorized and different URIs may be provided to access each particular category of information for each published resource. For example, a service's utilization history, a current snapshot of operational run-time utilization (e.g., memory, disk, and/or processor utilizations), service configuration and configuration control points, provisioning policies and access methods, and service APIs may be collected. Additionally, where a resource provides a representational state transfer (REST) interface, that information may also be collected by the consuming resource(s).

The information provided to the resource provisioning-link registry may be further embellished through the use of other instrumentation that data provider repositories make available over time to increase the published information related to a given resource or an inter-related/inter-dependent set of resources. A resource dependency topology (e.g., services container) may also be treated as an independent resource that may be further referenced in future work or analytics to perform predictive performance analytics of the services container as a service itself.

It should be noted that the interface and dependency information provided within the resource provisioning-link registry may be represented in any form and accessed as appropriate for a given implementation. For example, resource description framework (RDF), open services for lifecycle collaboration (OSLC), Web Service Xchange (WSX), or other implementation methodologies may be used, again as appropriate for the given implementation. URIs may be returned in response to resource constraint queries issued to the resource provisioning-link registry.

As discussed above, a newly-developed resource may be published to the resource provisioning-link registry and the newly-developed resource may become a member of the library of published resources. Resource information for the newly-developed resource may be automatically harvested from the resource as the resource is published, or may be provided and/or enhanced by the developer of the new resource. As such, information usable for integrating and reusing the new resource as a component of other resources may be made available at the time of publication of the resource within the resource provisioning-link registry, and the library of available, reusable resources may grow dynamically over time for future application and service solution development efforts.

A constraint-based resource provisioning tool may include a workflow design graphical user interface (GUI) with a toolbox library of available resources. A developer may design resources by mixing and matching resources using a "drag and drop" style for enhanced resource development within the workflow design GUI. The constraint-based resource provisioning tool may query the resource provisioning-link registry for resources that satisfy one or more constraints specified for a resource under development. The resource provisioning-link registry may return resource identifiers and URIs that allow the constraint-based resource provisioning tool to programmatically (e.g., automatically) traverse the URIs to retrieve resource information from dynamic data provider service(s), such as the data provider repositories that store the respective resources. As such, the data provider repositories may be programmatically accessed to obtain information about a current state of available resources usable to build a new resource with pre-defined operational and integration constraints. The constraint-based resource provisioning tool may analyze the retrieved resource information and provide resource integration recommendations to the resource developer/user. The user may then select individual resources, and additional URIs may be programmatically traversed by the constraint-based resource provisioning tool to retrieve additional resource information (e.g., available API options, etc.).

The present technology may be implemented to leverage OSLC-style data provider services to obtain information from provisionable services. Service API information may be published to the resource provisioning-link registry, and the workflow design GUI may provide REST application program interface (API) templates for assembling resources, as appropriate for a given implementation. However, it should be noted that other forms of resource APIs may be used as appropriate for a given implementation. As such, the term "API" and its plural are used herein.

The APIs that are listed by services (e.g., by instances of service applications) may be integrated into a resource work flow. If the selected resource has dependent resources, then those dependent resources are also automatically identified and automatically included into the new resource. As a drag and drop operation of a resource by a user is detected, a detailed request may be issued by the constraint-based resource provisioning tool to the resource information provider using the appropriate published URI to retrieve information about the respective API parameters.

The constraint-based resource provisioning tool may utilize the information obtained from the resource provisioning-link registry to analyze and optimize use of sub-services utilized by (e.g., that are dependencies of) multiple resources that are included as part of a newly-developed resource. For example, if a newly-developed application utilizes two services: (i) a hypertext transfer protocol (HTTP) server, and (ii) a database server (e.g., a DB2® server), and each of these two services utilizes the same sub-service (e.g., a Websphere® application server (WAS)), the common dependency may be identified. As these two services with the common sub-service are dragged into the workflow from the toolbox library of available resources, the dependency on the same sub-service may trigger automated identification of a set of resources that satisfy both services. A pop-up dialog may be provided to the user for merging the sub-service WAS server that allows the developer to accept or modify the identified set of resources.

Once the application is defined by adding the appropriate component services into the work flow and adding the appropriate interconnectivity, a resource/parameter template may be automatically generated. The developer may modify the resource template as appropriate for a given implementation, and the newly-developed resource may be published as a service in the library toolbox. The newly-developed resource may then be identified by other developers, and the resource may be reused to create other higher-level resources.

As such, a set of technical features may be provided by the technology described herein. The present technology may publish resource information about attached services and related topology with other services or resources. The published information may provide an API that allows developers to obtain API structures for resources. The API may also allow developers to obtain parameter schema that apply to a given resource's API. The API may additionally allow developers to obtain output schema that apply to a given resource's API.

These types of information, structures, and schema may be obtained using automated resource "discovery," and may also be obtained from documentation artifacts that contain API documentation. Detailed responses to resource information requests may be generated and received to return the APIs, the API parameter specifications, and the output schema. Documentation regarding usage of a given API may also be retrieved, and may be implemented using OSLC calls (e.g., OSLC REST calls) that return help-related material for a given resource's API.

As such, the present technology provides a distributed resource development architectural platform for building resources out of a library of component resources. Published resource provisioning information may be compared with the defined constraints of a new resource under development. Developed resources may provide their interfaces and relationships in a harvestable manner, and thereby may provide a "self-reporting" feature by which the resources and their dependencies may be discovered. In this manner, the information source (the resource) is decoupled from the service that is provided by the resource. Assembly of a service solution may be performed using an extensive set of information published for each resource, such as a resource's documentation, configuration, connectivity, availability, and operational health. As such, the present technology provides an opportunity for resource developers to make informed selections for use of a resource and for control over of the resource's overall interaction with a service solution based on information that is accessible using registry interface query capabilities (e.g., OSLC or other interface).

As described above, the present technology allows different component resources to be heterogeneous and physically distributed within different storage repositories. The present technology also allows a variety of component services with different interfaces to be integrated together using information harvested from the resources themselves about the services provided by the resources and the resources' operational constraints.

The resource provisioning-link registry may be considered to provide a "link data" service, in that the resource provisioning-link registry publishes resources and URIs to resource information locations within the respective data provider repositories within which the resources are stored. Resource development project management may be further improved using the link data service to gather resource information using a programmatic link data protocol, as described in more detail below. These improvements may be further increased through instrumented data gathering performed without interfering with operations of the involved resources that are published into the link data service.

Collected resource information itself may also be organized into resources, and inter-relationships to other collected resource information may be organized into resources to fulfill the dependency management aspects of selected resources used by an application. Further, as information interests change over time, the present technology may also provide a dynamic multi-dimensional variation of the published resource information, such that a given resource may provide different information over time for differing categories of interest to improve analysis of resources. The present technology may also improve resource scaling considerations because detailed dependent resource information may be requested only when needed as determined by the processing for new resource development. In this way, the present technology may be considered an open-ended scalable resource management platform.

It should be noted that conception of the present subject matter resulted from recognition of certain limitations associated with development of applications and service solutions. For example, it was observed that the complexity of software application and service solution development has increased over time and that repositories of applications and service solutions may have applications or service solutions that may be reused. However, prior technologies lack capabilities to publish application information and information regarding dependencies on other components (e.g., other applications or services). It was further observed that heterogeneous components may exist in different component/services registries and that prior technology did not provide a way to identify or integrate heterogeneous components from different component/services registries. In view of these observations, it was determined that new technology that provides a dynamic and multi-dimensional construction of applications and service solutions that may increase in dimensionality over time as more information becomes populated within different registries may improve component reuse and may improve efficiency of application and service solution development and deployment. It was further determined that new technology that monitors deployed applications and service solutions over time and across repositories, and that adapts deployed components based upon changes to underlying dependencies on other components may be automated and may improve deployed solutions over time consistently with improvements and changes to the underlying components. It was additionally determined that new technology that specifies application programming interfaces (APIs) of repository components, such that more informed decisions may be made regarding combinations of components for reuse and development of new applications and service solutions, may improve usability and implementation of combinations of heterogeneous repository components. It was also determined that new technology that provides a methodology/protocol of linked data among repository components may reduce complexities and errors that may otherwise be associated with reuse of repository components. It was determined that capabilities within this methodology/protocol of linked data for managing heterogeneous types of components by integration of disparate data provider interfaces may extend opportunities for reuse. It was additionally determined that implementation of the methodology/protocol of linked data using a cross-repository "conformant" interface information access schema that may be used in a registry-like manner to perform automated discovery of component information by use of a common query language may further support reuse and integration of heterogeneous components. The present subject matter improves application and service solution development and deployment by providing component services integration with dynamic constraint provisioning, as described above and in more detail below. As such, improved application and service solution development, deployment, and adaptability may be obtained through use of the present technology.

The component services integration with dynamic constraint provisioning described herein may be performed in real time to allow prompt design, deployment, and adaptation of applications and service solutions. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
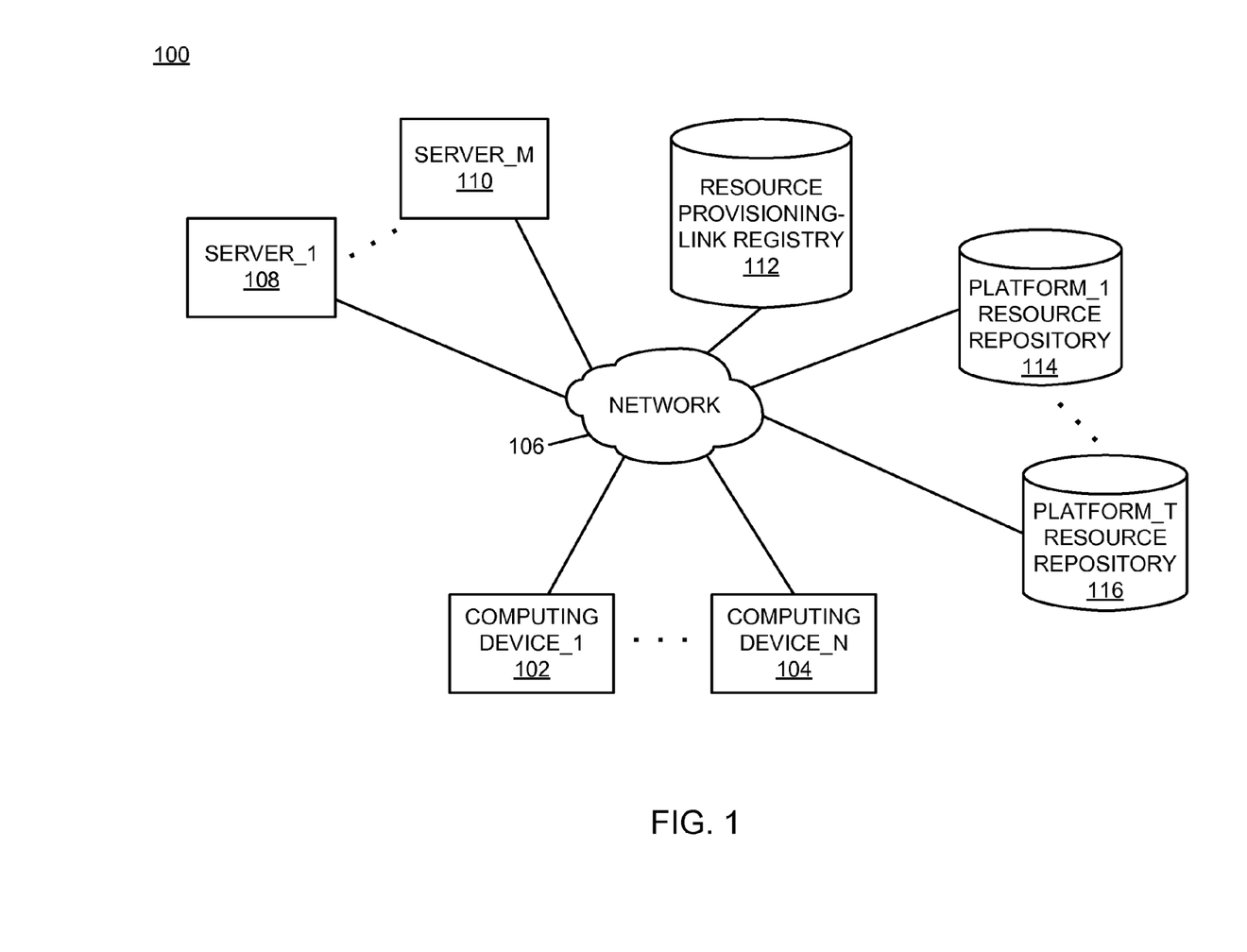
FIG. 1 is a block diagram of an example of an implementation of a system for component services integration with dynamic constraint provisioning according to an embodiment of the present subject matter.

FIG. 1 is a block diagram of an example of an implementation of a system 100 for component services integration with dynamic constraint provisioning. A computing device_1 102 through a computing device_N 104 may be used by resource developers. The computing devices 102 through 104 communicate via a network 106 with several other devices. The other devices include a server_1 108 through a server_M 110, and a resource provisioning-link registry 112. The resource provisioning-link registry 112 aggregates resource information links published by a set of heterogeneous platform resource repositories, including a platform_1 resource repository 114 through a platform_T resource repository 116.

The present technology implements a "link data" interface between the respective devices to provide service-provider resource information link aggregation within the resource provisioning-link registry 112. The "link data" interface provides links to multiple sets of information configured to provide increasing granularity as links are traversed. Links provided by the link data interface may be programmatically traversed to retrieve information, such as to make resource recommendations and for other information retrieval purposes.

The platform_1 resource repository 114 through the platform_T resource repository 116 may also be considered "data providers" at the different heterogeneous platform resource repositories that publish information that describe the use and functionality of the respective resources stored in the repositories, as described above. This resource information may be aggregated by the resource provisioning-link registry 112 for use in the creation of new developerconstrained resources that leverage the underlying heterogeneous resources across the distributed set of resource repositories.

As such, the platform_1 resource repository 114 through the platform_T resource repository 116 as data providers (e.g., data provider repositories) represent entities that collect information assembled as resources are discovered. These data providers dynamically update available resource information as it becomes available or changes over time. The resource provisioning-link registry 112 may provide a cross-repository "conformant" interface information access schema that may be consumed by developer computing devices for development of new resources.

Further, regarding the individual data provider repositories, these data provider repositories may report information about resources to the resource provisioning-link registry 112 for reconciliation and aggregation. The reported resource information may include resource health, availability, configuration, documentation, security, capability, and other information as appropriate for a given implementation. In this way, the data provider repositories use the native private and public interfaces of the respective resources under management to gather and publish the resource information. The data provider repositories may identify and apply relationships that exist between resources assembled from managed resource data source information.

As such, managed resources may be developed to externalize information, and that information may be leveraged as a data source for the data provider repositories. Additionally, the data provider repositories insulate the managed resources from changes when the respective resources are instrumented and/or provide public interfaces that may be published. In this manner, the present technology provides a loosely coupled integration that allows dynamic changes to resources and resource relationships over time.

Resources may be registered with their published information into the resource provisioning-link registry 112. As such, the resource provisioning-link registry 112 may be considered a "link data registry service" that is responsible for managing resources across all registered data providers. Resources may be reconciled across the disparate repositories, and relationship topologies may be applied to the resources under management. Clients of the link data registry service may include any applications or services that are capable of communicating with the resource provisioning-link registry 112, which as described above may include a REST link data protocol or other protocol as appropriate for a given implementation.

As will be described in more detail below in association with FIG. 2 through FIG. 4B, the resource provisioning-link registry 112 in conjunction with the data provider repositories platform_1 resource repository 114 through the platform_T resource repository 116 may be utilized by the server_1 108 through the server_M 110 and the computing device_1 102 through the computing device_N 104 to perform the automated component services integration with dynamic constraint provisioning described herein. The functionality described with respect to the different devices may be partitioned and distributed as appropriate for a given implementation. As such, the present technology may be implemented at a user computing device or server device level. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device.

Further, any of the respective server_1 108 through the server_M 110 may provide an application-server style of interface to the resource provisioning-link registry 112. Alternatively, the resource provisioning-link registry 112 may perform its own server capabilities to allow the information published by the resource provisioning-link registry 112 to be accessed directly by any of the other respective devices, as appropriate for a given implementation.

The platform_1 resource repository 114 through the platform_T resource repository 116 may include a relational database, an object database, or any other storage type of device. As such, the platform_1 resource repository 114 through the platform_T resource repository 116 may be implemented as appropriate for a given implementation.

Figure 2:
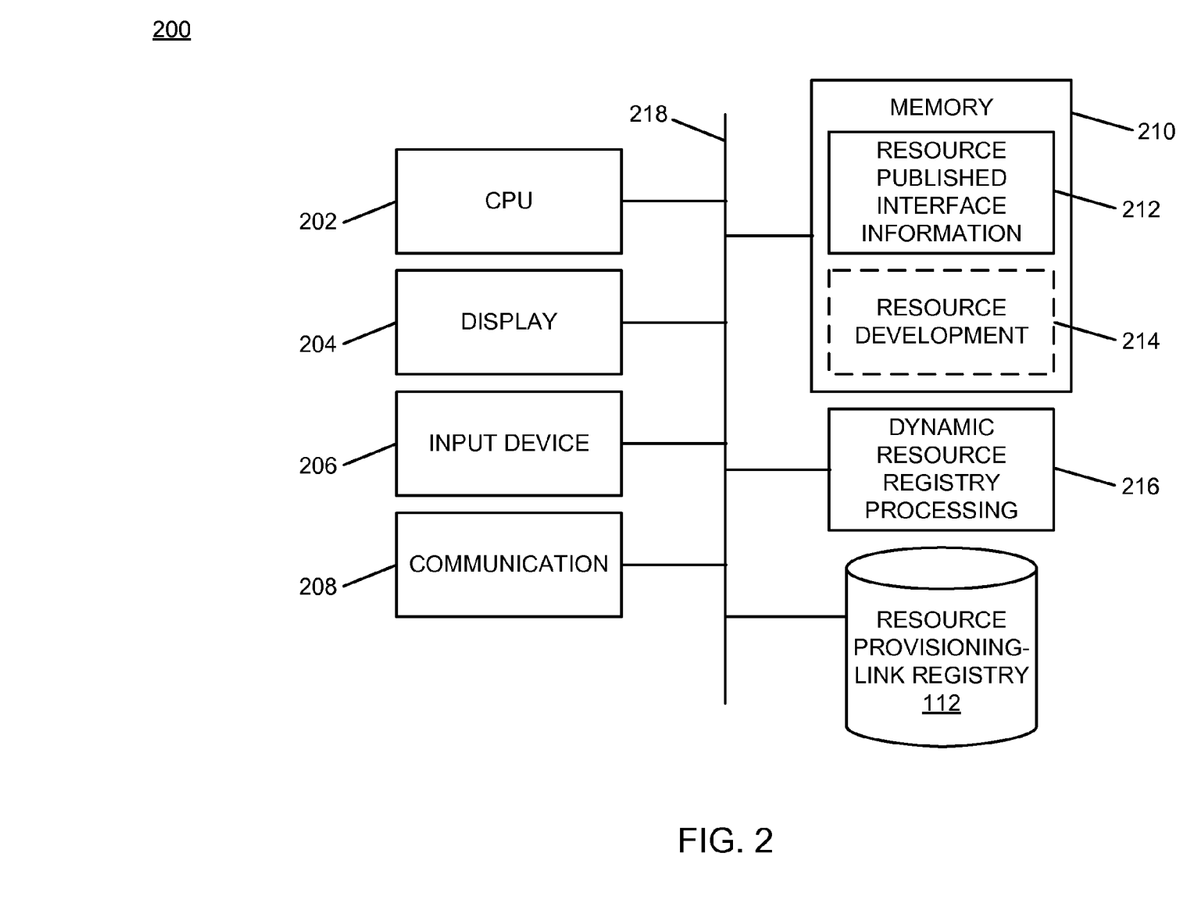
FIG. 2 is a block diagram of an example of an implementation of a core processing module capable of performing component services integration with dynamic constraint provisioning according to an embodiment of the present subject matter.

FIG. 2 is a block diagram of an example of an implementation of a core processing module 200 capable of performing component services integration with dynamic constraint provisioning. The core processing module 200 may be associated in its entirety or in part with any of the devices described above in FIG. 1, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of published resource information and resource development in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, appropriate for a given implementation. As such, the communication module 208 represents a communication device capable of carrying out communications with other devices.

A memory 210 includes a resource published interface information storage area 212 that stores interface information related to published resources for use by the core processing module 200. The interface information related to published resources stored within the resource published interface information storage area 212 may be used to process the cross-repository "conformant" interface information access schema that may be published by data provider repositories for use by the resource provisioning-link registry 112 to aggregate and further publish resource information that may be consumed by the developer computing devices for development of new resources.

The memory 210 also includes a resource development area 214. The resource development area 214 is illustrated in a dashed-line representation to represent that this area may be used by developers within the computing device_1 102 through the computing device_N 104 to access and consume published resource information to create new resources that may be published to a particular data provider repository appropriate for the development platform, and that may be further published by the respective data provider repositories and accessed by the resource provisioning-link registry 112 for aggregation and further reuse.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A dynamic resource registry processing module 216 is also illustrated. The dynamic resource registry processing module 216 provides resource information publishing, aggregation, and/or consumption processing for the core processing module 200, as appropriate for the given device from FIG. 1 in which the core processing module 200 is implemented. The dynamic resource registry processing module 216 implements the automated component services integration with dynamic constraint provisioning of the core processing module 200.

It should also be noted that the dynamic resource registry processing module 216 may form a portion of other circuitry described without departure from the scope of the present subject matter. Further, the dynamic resource registry processing module 216 may alternatively be implemented as an application stored within the memory 210. In such an implementation, the dynamic resource registry processing module 216 may include instructions executed by the CPU 202 for performing the functionality described herein. The CPU 202 may execute these instructions to provide the processing capabilities described above and in more detail below for the core processing module 200. The dynamic resource registry processing module 216 may form a portion of an interrupt service routine (ISR), a portion of an operating system, a portion of a browser application, or a portion of a separate application without departure from the scope of the present subject matter.

The resource provisioning-link registry 112 is again shown within FIG. 2 associated with the core processing module 200. As such, the resource provisioning-link registry 112 may be operatively coupled to the core processing module 200 without use of network connectivity, as appropriate for a given implementation. It should also be noted, that while not illustrated to reduce crowding within FIG. 2, one or more of the respective platform_1 resource repository 114 through the platform_T resource repository 116 may be hosted by operative coupling to the core processing module 200, again without use of network connectivity for access. Any links provided by any of the resource provisioning-link registry 112 and the platform_1 resource repository 114 through the platform_T resource repository 116 may be published via a network, such as the network 106, to allow access to the link-hosted resource information by other link-information consuming modules.

The CPU 202, the display 204, the input device 206, the communication module 208, the memory 210, the dynamic resource registry processing module 216, and the resource provisioning-link registry 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the resource provisioning-link registry 112 is illustrated as a separate component for purposes of example, the information stored within the resource provisioning-link registry 112 may also/alternatively be stored within the memory 210 without departure from the scope of the present subject matter. Accordingly, the core processing module 200 may take many forms and may be associated with many platforms.

Figure 3:
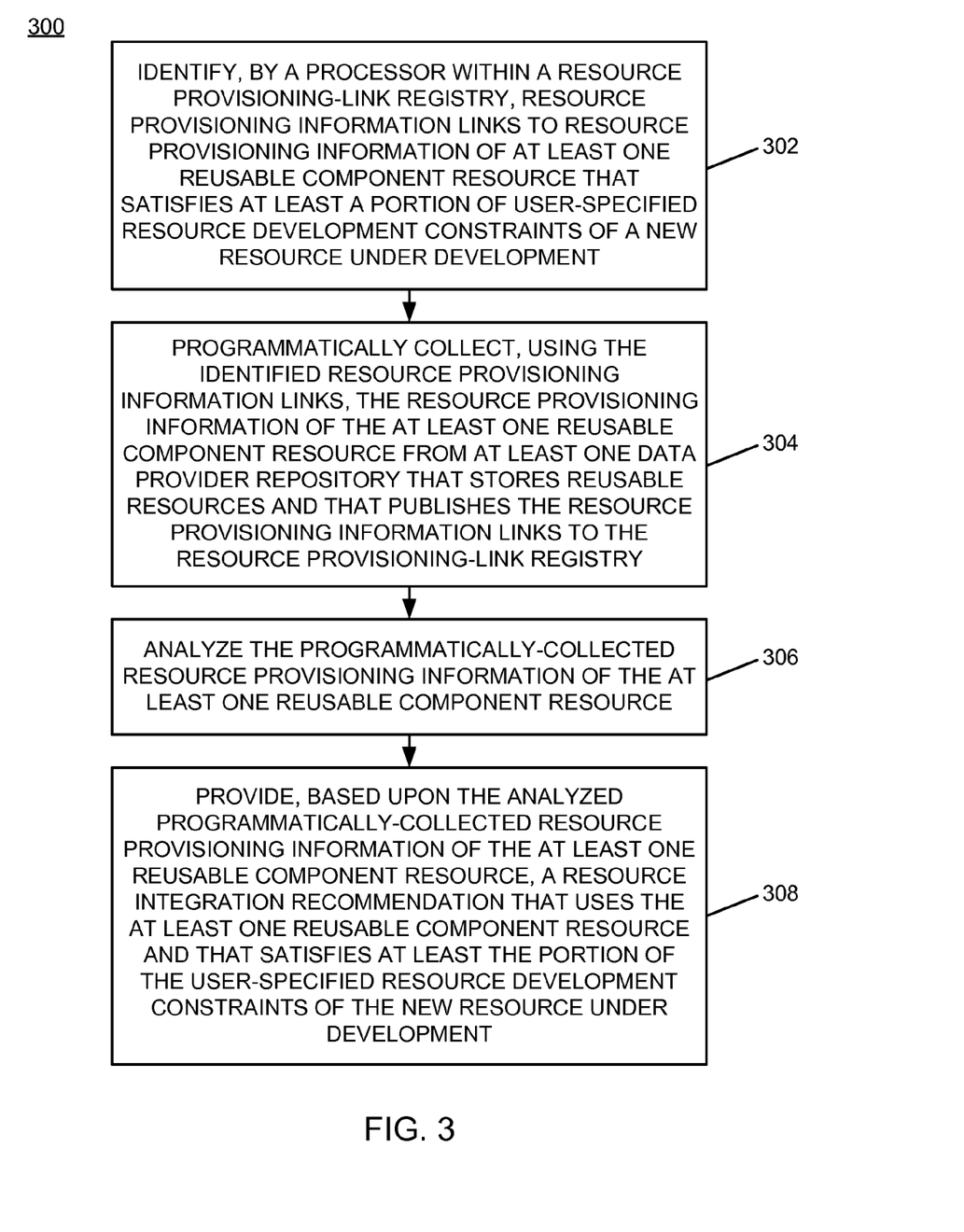
FIG. 3 is a flow chart of an example of an implementation of a process for component services integration with dynamic constraint provisioning according to an embodiment of the present subject matter.
Figure 4A:
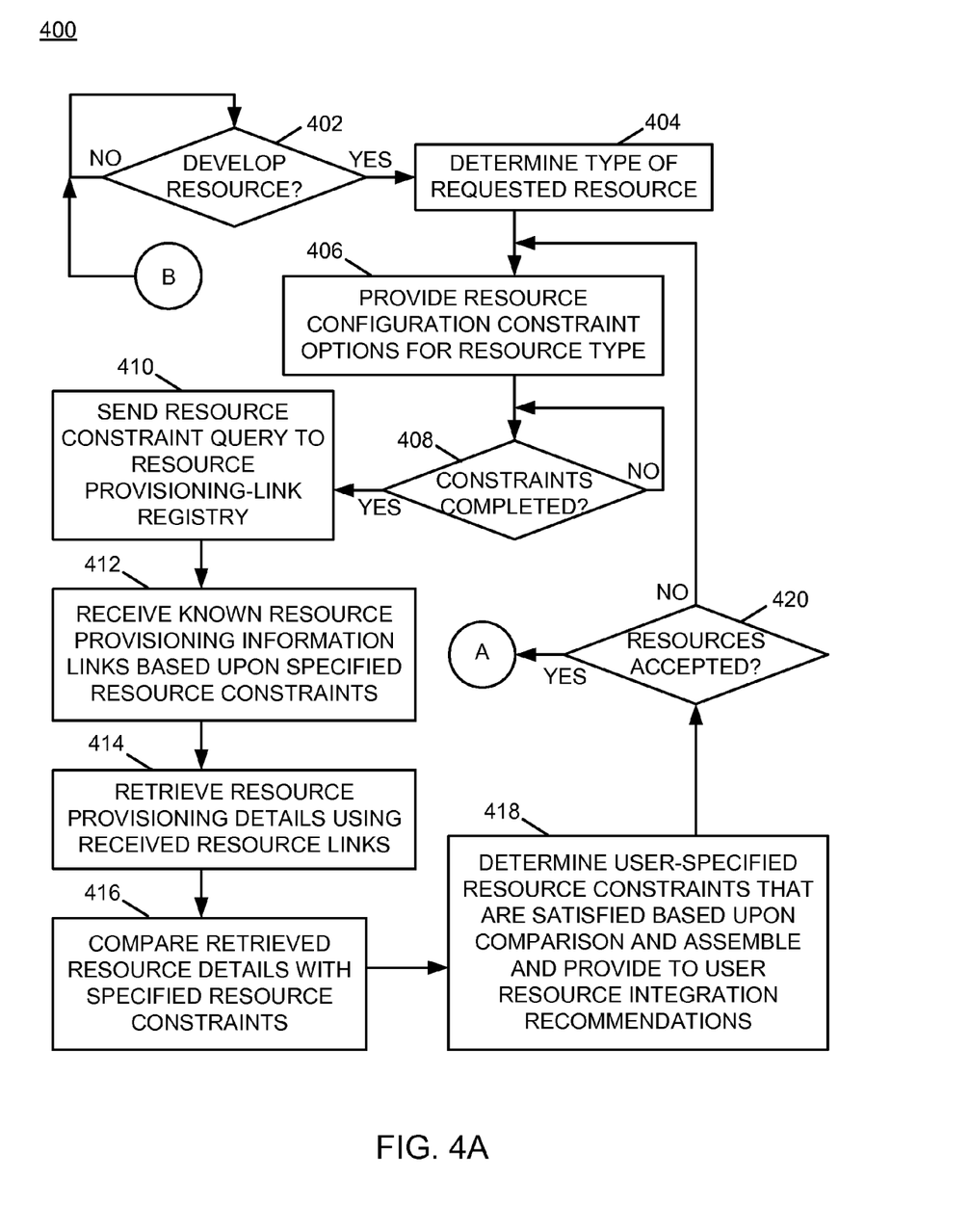
FIG. 4A is a flow chart of an example of an implementation of initial processing within a process for component services integration with dynamic constraint provisioning that shows interactions with each of a resource provisioning-link registry and one or more data provider repositories according to an embodiment of the present subject matter.
Figure 4B:
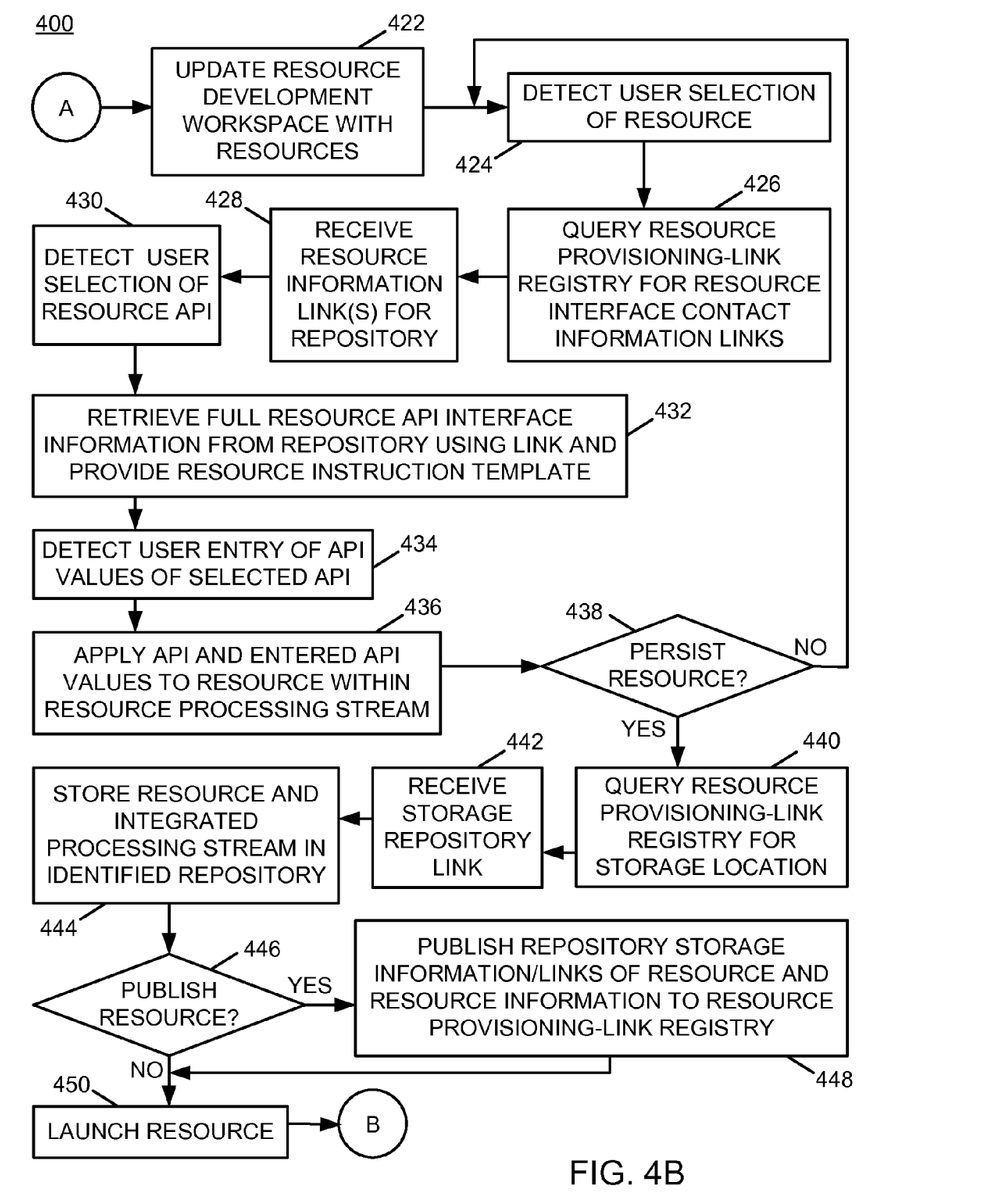
FIG. 4B is a flow chart of an example of an implementation of additional processing within a process for component services integration with dynamic constraint provisioning that shows interactions with each of a resource provisioning-link registry and one or more data provider repositories according to an embodiment of the present subject matter.

FIG. 3 through FIG. 4B described below represent example processes that may be executed by devices, such as the core processing module 200, to perform the automated component services integration with dynamic constraint provisioning associated with the present subject matter. Many other variations on the example processes are possible and all are considered within the scope of the present subject matter. The example processes may be performed by modules, such as the dynamic resource registry processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for component services integration with dynamic constraint provisioning. At block 302, the process 300 identifies, by a processor within a resource provisioning-link registry, resource provisioning information links to resource provisioning information of at least one reusable component resource that satisfies at least a portion of user-specified resource development constraints of a new resource under development. At block 304, the process 300 programmatically collects, using the identified resource provisioning information links, the resource provisioning information of the at least one reusable component resource from at least one data provider repository that stores reusable resources and that publishes the resource provisioning information links to the resource provisioning-link registry. At block 306, the process 300 analyzes the programmatically-collected resource provisioning information of the at least one reusable component resource. At block 308, the process 300 provides, based upon the analyzed programmatically-collected resource provisioning information of the at least one reusable component resource, a resource integration recommendation that uses the at least one reusable component resource and that satisfies at least the portion of the user-specified resource development constraints of the new resource under development.

FIGS. 4A-4B illustrate a flow chart of an example of an implementation of process 400 for component services integration with dynamic constraint provisioning that shows interactions with each of a resource provisioning-link registry and one or more data provider repositories. It should be noted that while the processing described in association with FIGS. 4A-4B is described in association with implementation of the process 400 at a developer computing device, the process 400 may alternatively be partitioned with the analytical processing implemented as a service provided by a server device, such as one of the server_1 108 through a server_M 110, and/or the resource provisioning-link registry 112. Where the analytics are implemented as a service, analytics associated with a particular resource under development by multiple developers may be reused at different stages of development, such as where different developers are responsible for different facets of resource development (e.g., resource provisioning versus resource performance, etc.). As such, the process 400 may be implemented as appropriate for a given implementation.

FIG. 4A illustrates initial processing within the process 400. At decision point 402, the process 400 makes a determination as to whether a request to develop a resource has been detected. A request to develop a resource may be entered by a user/developer within a dynamically-constrained resource provisioning workspace within which the process 400 operates, and may include invocation of a new project request to develop any form of resource described above and herein, such as an application, a service solution, or other resource. In response to determining that a request to develop a resource has been detected, the process 400 determines a type of the requested resource at block 404, which again may include an application, a service solution, or other type of resource.

At block 406, the process 400 provides resource configuration constraint options for the requested resource type. The user may be presented with the opportunity to specify constraints from a variety of categories that represent specifications for operation of the new resource. The process 400 may create an editable resource profile from the constraint selections to further guide resource development and information analysis.

The resource constraint options may include, among other things, deployment configuration constraints that include information about how and where to deploy and configure the resource. The resource constraint options may further include application scheduling constraints including information describing when the resource should run and how often, and life cycle information (e.g., backup and restore procedures, etc.). The resource constraint options may also include application storage constraints that specify expected storage utilization of the resource and its components. Other example resource constraint constraints include application disk constraints that specify expected disk utilization of the resource; resource security constraints that assign roles and permissions to the resource and its components/interfaces and that assign protocols and certificates to the interfaces; resource connectivity constraints that apply settings to enable HTTP, HTTPS, or other supported transports to be utilized by the resource including port assignments, and gateway and firewall settings; resource component constraints that specify information about other types of resources to be utilized by the new resource including as examples databases, web servers, application platform servers, queue servers, and other forms of services or devices; and resource dependency constraints that specify information about links to the other participating resources that are not directly a part of the resource under development. Many other forms of resource constraints are possible, and any resource constraints appropriate for a given implementation are considered within the scope of the present technology.

At decision point 408, the process 400 makes a determination as to whether user entry and receipt of the resource constraints and assembly of the editable resource profile have been completed. In response to determining that user entry of resource constraints and assembly of the editable resource profile have been completed, at block 410 the process 400 sends a resource constraint query to a resource provisioning-link registry, such as the resource provisioning-link registry 112, to retrieve published available resource(s) information. As such, the process 400 may discover registered services and component contact information within distributed heterogeneous resource repositories that may be relevant to the constraints of the resource profile. The queries herein are distinguishable from other forms of queries because the queries described herein retrieve resource development and provisioning information. The queries may be contextualized based upon the resource constraints specified by the user.

Responsive to receipt of the contextualized resource constraint query, the resource provisioning-link registry processes the contextualized resource constraint query and returns one or more uniform resource identifiers (URIs) that may be used programmatically by the process 400 to contact disparate and heterogeneous link service providers (e.g., data provider repositories) to retrieve information. The URIs, when programmatically processed by the process 400, may each return information about a particular aspect of a resource, as described in more detail below. The scope of the information returned by any URI may be granularized as appropriate for a given implementation.

At block 412, the process 400 receives a response from the resource provisioning-link registry that includes known resource provisioning information links that were identified by the resource provisioning-link registry based upon the specified resource constraints contextualized within the resource constraint query sent to the resource provisioning-link registry. The resource provisioning information links may each specify one or more of resource configuration details, resource utilization details, resource availability details, resource security details, and resource connectivity details of each reusable component resource identified to potentially match one or more of the specified resource constraints.

At block 414, the process 400 retrieves resource provisioning details using the received resource links (URIs) that specify the resource contact information locations. It should be noted that the process 400 may independently perform an automated traversal of URIs as a form of internal REST processing. The URIs may be used programmatically as resource contact points, and do not have to be externalized to the user. As described above, the data provider repositories are entities that gather information about managed resources. The resources include information about system configuration for resource use, installed software applications, services, components, configuration, security, monitored health, resource utilization, and other forms of information. As described above, each aspect of the resource information may be accessed using a specific URI.

At block 416, the process 400 compares the retrieved resource details with the specified resources constraints. As such, the process 400 analyzes two sets of information: the specified resource constraints and the detailed information that is returned that identifies resource integration options that may satisfy or match the specified resource constraints.

At block 418, the process 400 determines, based upon the resource constraint comparison, user-specified resource development constraints of the new resource under development that are satisfied by the programmatically-collected resource provisioning information, and assembles and provides to the user one or more resource integration recommendations. The resource integration recommendation(s) may include rankings where multiple resource integration options are possible, and the specified resource integration recommendations may either directly satisfy or may approximate the specified resource constraints.

At decision point 420, the process 400 makes a determination as to whether a user has indicated that one or more resources of the resource integration recommendations are accepted by the user for further development of the resource. In response to determining that a complete set of resources and integration recommendations is not fully accepted, the process 400 returns to block 406, and iterates as described above to allow the user to refine the user-specified resource constraints until an acceptable set of resource integration recommendations and rankings is assembled by the process 400. As such, the process 400 may iterate as appropriate to further assist the user with new resource development by identification of alternative sets of resource integration recommendations.

In response to determining that a complete set of resources and integration recommendations has been fully accepted, the process 400 transitions to the processing shown and described in association with FIG. 4B.

FIG. 4B illustrates additional processing associated with the process 400 for component services integration with dynamic constraint provisioning that shows interactions with each of a resource provisioning-link registry and one or more data provider repositories. At block 422, the process 400 updates the dynamically-constrained resource provisioning workspace with selected resources. The selected resources may be topologically displayed based on selected inherited dependencies. It should be noted that the description below may represent a second phase of operations within the process 400, where a set of recommended resources has been selected and the user may be provided with options to further investigate information related to (e.g., drill down into) any one of the selected resources and to use the selected resources as sources for more information. For example, where a particular resource is a database, the database resource may be selected and available API/REST interfaces may be evaluated to determine which of a potential set of alternative APIs are to be utilized for the new resource. The user may begin to assemble processing sequences between the selected resources. The individual resources may be selected and selection may result in the process 400 performing additional information queries using additional/different URIs associated with the resources to retrieve more detailed information related to APIs and other aspects from which a resource template may be created, and by which integration code may be injected into a processing stream.

At block 424, the process 400 detects a user selection of a resource. At block 426, the process 400 queries the resource provisioning-link registry for resource interface contact information links. As such, the resource provisioning-link registry may be queried to retrieve contact information for APIs/REST options that are available for the selected resource. The resource provisioning-link registry may include the data provider repository-supplied contact information that specifies where access should be made to the data provider repository to obtain the appropriate API/REST schemas and documents for the resource. As such, the data provider repositories may manage REST/API and document information for managed resources, and that information may be made available by publication within the resource provisioning-link registry service to the clients of the resource provisioning-link registry service. It should be noted that this processing responsive to user selections may be iterative to repeatedly query the resource provisioning-link registry for resource interface contact information for different resources.

At block 428, the process 400 receives resource information link(s) for the repository(ies) where the selected resources are stored. At block 430, the process 400 detects a user selection of a resource API. At block 432, the process 400 retrieves full API interface information for the resource retrieved from the repository using a resource API information link hosted by the data provider repository that hosts the selected reusable component resource, and provides a resource instruction template that includes any user-enterable and available API options and parameter value options for different APIs of the selected resource. There may be different classifications of APIs for different classes of use of the resource, and there may be different levels of functionality provided by different APIs. As such, the user may review API options and select which one of the available APIs to use. At block 434, the process 400 detects user entry of API values of one of the selected APIs into to the instruction template. At block 436, the process 400 applies the API and the entered API values to the resource within the processing stream (e.g., source code).

At decision point 438, the process 400 makes a determination as to whether a user request to persist all or a portion of the resource has been detected. In response to determining that a user request to persist all or a portion of the resource has not been detected, the process 400 returns to block 424 and iterates as described above to provide the user with additional resource specification opportunities.

In response to determining that a user request to persist all or a portion of the resource has been detected at decision point 438, the process 400 queries the resource provisioning-link registry for a storage location for the resource or portion of the resource at block 440. The storage location for the resource may be to any of the available data provider repositories, such as the platform_1 resource repository 114 through the platform_T resource repository 116, as appropriate for a given resource and implementation. At block 442, the process 400 receives a storage repository link (e.g., URI) that specifies where the resource, or portion of the resource, is designated to be stored. At block 444, the process 400 stores the resource and integrated processing stream (all or a portion) in the identified repository at the location of the received URI.

At decision point 446, the process 400 makes a determination as to whether a user request to publish the resource has been detected. It should be noted that resources may be developed over time, and that completed resources may be published so that they are available for reuse by other developers. Users may opt not to publish resources under development. Alternatively, users may opt to publish resources under development, for example, where the users are part of a collaborative development team and a resource under development is being handed off to another developer for additional development activities (e.g., at a different layer of processing). As such, the user may save the resource to later resume development and may apply modifications over time, or the user may select the resource or a subset of what has been completed as a useful sub-component and may publish the resource or the sub-component for reuse as part of a different project or for reuse within a current project.

In response to determining at decision point 446 that a user request to publish the resource has been detected, the process 400 publishes the repository information (e.g., URIs, links) of the resource storage location and resource information to the resource provisioning-link registry at block 448. The saved resources may become available to reuse elsewhere as a managed component resource.

In response to publishing the respective resource information to the resource provisioning-link registry at block 448, or in response to determining at decision point 446 that a user request to publish the resource has not been detected, the process 400 launches the resource at block 450. The process 400 returns to the processing described in FIG. 4A at decision point 402 and iterates as described above. It should be noted that additional processing for testing and verifying functionality of a resource is considered to form a portion of the process 400, and is omitted to avoid crowding in the respective drawing figures.

As described above in association with FIG. 1 through FIG. 4B, the example systems and processes provide component services integration with dynamic constraint provisioning. Many other variations and additional activities associated with component services integration with dynamic constraint provisioning are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
   by a processor operative as part of a distributed resource development architectural platform:
   establishing, responsive to receipt of user-specified resource development constraints of a new resource under development, a network connection to a resource provisioning-link registry that hosts resource provisioning information links to resource provisioning information of reusable component resources located within one or more resource repositories, where the resource provisioning information specifies (i) published resource instrumentation options that specify details of different public interfaces to different features provided by the reusable component resources and (ii) technical provisioning details related to reuse of the reusable component resources in newly-developed resources, where the published resource instrumentation options of one or more of the reusable component resources specify different classifications of resource application programming interfaces (APIs) for different classes of use of each of the respective one or more reusable component resources;

programmatically traversing the resource provisioning information links while collecting the resource provisioning information of at least one reusable component resource;

programmatically evaluating the published resource instrumentation options and the technical provisioning details specified within the programmatically-collected resource provisioning information of the at least one reusable component resource against the user-specified resource development constraints of the new resource under development;

providing, based upon the evaluation of the published resource instrumentation options and the technical provisioning details, a resource integration recommendation that details the published resource instrumentation options and the technical provisioning details related to provisioning the at least one reusable component resource and that satisfies at least a portion of the user-specified resource development constraints of the new resource under development;

retrieving, responsive to a user selection within a dynamically-constrained resource provisioning workspace of a reusable component resource and of one of a plurality of available resource APIs specified within the published resource instrumentation options as being provided by the selected reusable component resource, resource API information of the selected resource API from a resource repository that hosts the selected reusable component resource using a resource API information link specific to the selected resource API and hosted by the resource repository;

providing a resource instruction template that comprises user-enterable and available resource API options and parameter value options that facilitate provisioning of the selected resource API of the selected reusable component resource;

detecting user entry of resource API values of the selected resource API; and applying the selected resource API and the entered resource API values of the selected reusable component resource within a resource processing stream to provision the selected resource API of the selected reusable component resource as part of the new resource under development.

2. The method of claim 1, further comprising the processor:

sending a resource constraint query to the resource provisioning-link registry that comprises the user-specified resource development constraints of the new resource under development; and receiving a response from the resource provisioning-link registry that identifies one or more of the resource provisioning information links within the resource provisioning-link registry to the resource provisioning information of a respective one or more of the reusable component resources that satisfy at least the portion of the user-specified resource development constraints; and where the processor programmatically traversing the resource provisioning information links comprises the processor programmatically traversing the one or more of resource provisioning information links identified within the response.

3. The method of claim 1, where the processor programmatically traversing the resource provisioning information links while collecting the resource provisioning information of the at least one reusable component resource, comprises the processor:

programmatically navigating the resource provisioning information links; and retrieving from at least one resource repository, using the resource provisioning information links, the resource provisioning information of the at least one reusable component resource, where the technical resource provisioning details are selected from a group consisting of resource configuration details, resource utilization details, resource availability details, resource security details, and resource connectivity details of the each of the at least one reusable component resource.

4. The method of claim 1, where a part of the processor programmatically evaluating the published resource instrumentation options and the technical provisioning details specified within the programmatically-collected resource provisioning information of the at least one reusable component resource against the user-specified resource development constraints of the new resource under development comprises the processor:

performing a resource constraint comparison between the published resource instrumentation options specified within the programmatically-collected resource provisioning information of the at least one reusable component resource and the user-specified resource development constraints of the new resource under development; and determining, based upon the resource constraint comparison, at least the portion of the user-specified resource development constraints of the new resource under development satisfied by at least one of the different features provided by the at least one reusable component resource as specified within the published resource instrumentation options.

5. The method of claim 1, further comprising the processor, responsive to providing the resource integration recommendation, iteratively refining the provided resource integration recommendation responsive to changes to the user-specified resource development constraints by a user.

6. The method of claim 1, further comprising the processor:

storing the new resource under development within one of the one or more resource repositories; and publishing to the resource provisioning-link registry, responsive to detecting an indication to publish provisioning information about the new resource under development within the resource provisioning-link registry, new resource provisioning information links that specify a resource storage location and resource provisioning information of the new resource under development, where the resource provisioning information of the new resource under development further comprises a different resource application programming interface (API) link for each different resource API provided for different classes of use of the new resource under development, where the new resource under development is reusable as a managed component resource.

\* \* \* \* \*